(No Model.) 4 Sheets—Sheet 1.
C. R. JAMES.
AIR BRAKE.
No. 524,990. Patented Aug. 21, 1894.
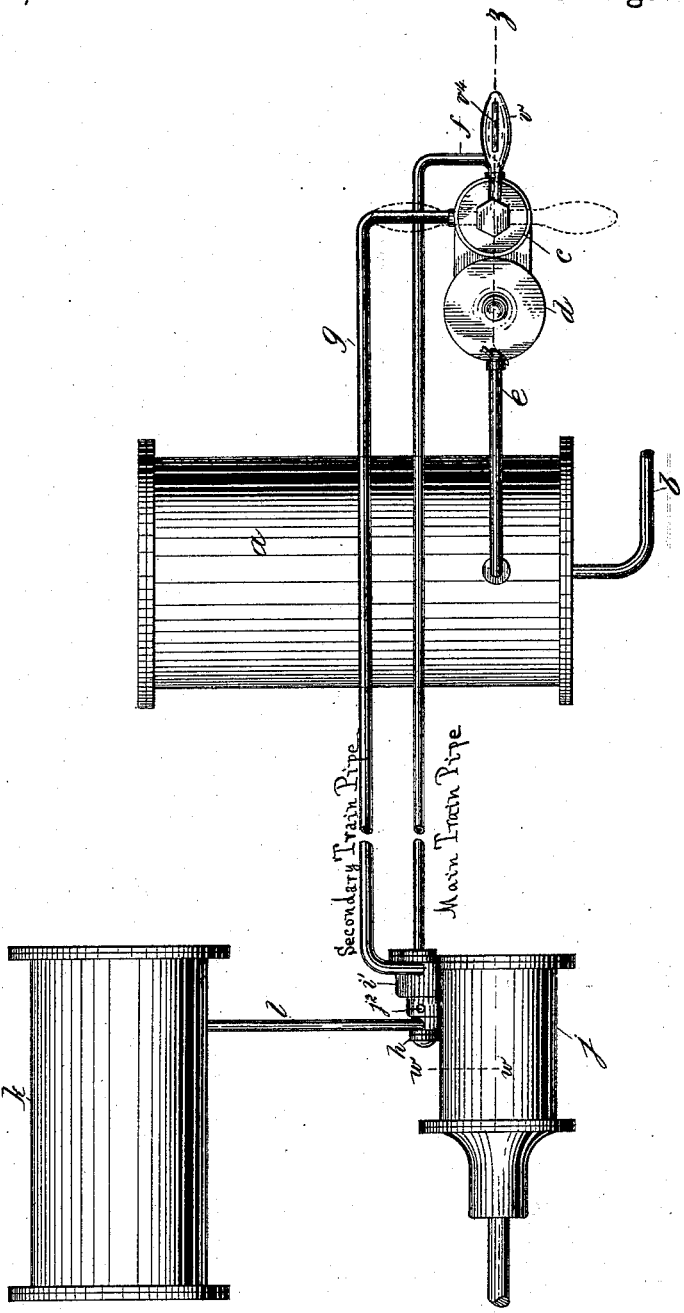
Witnesses:
John Buckler,
D. J. Morgan
Inventor:
Chist. R. James
By A. P. Thayer
Attorney.

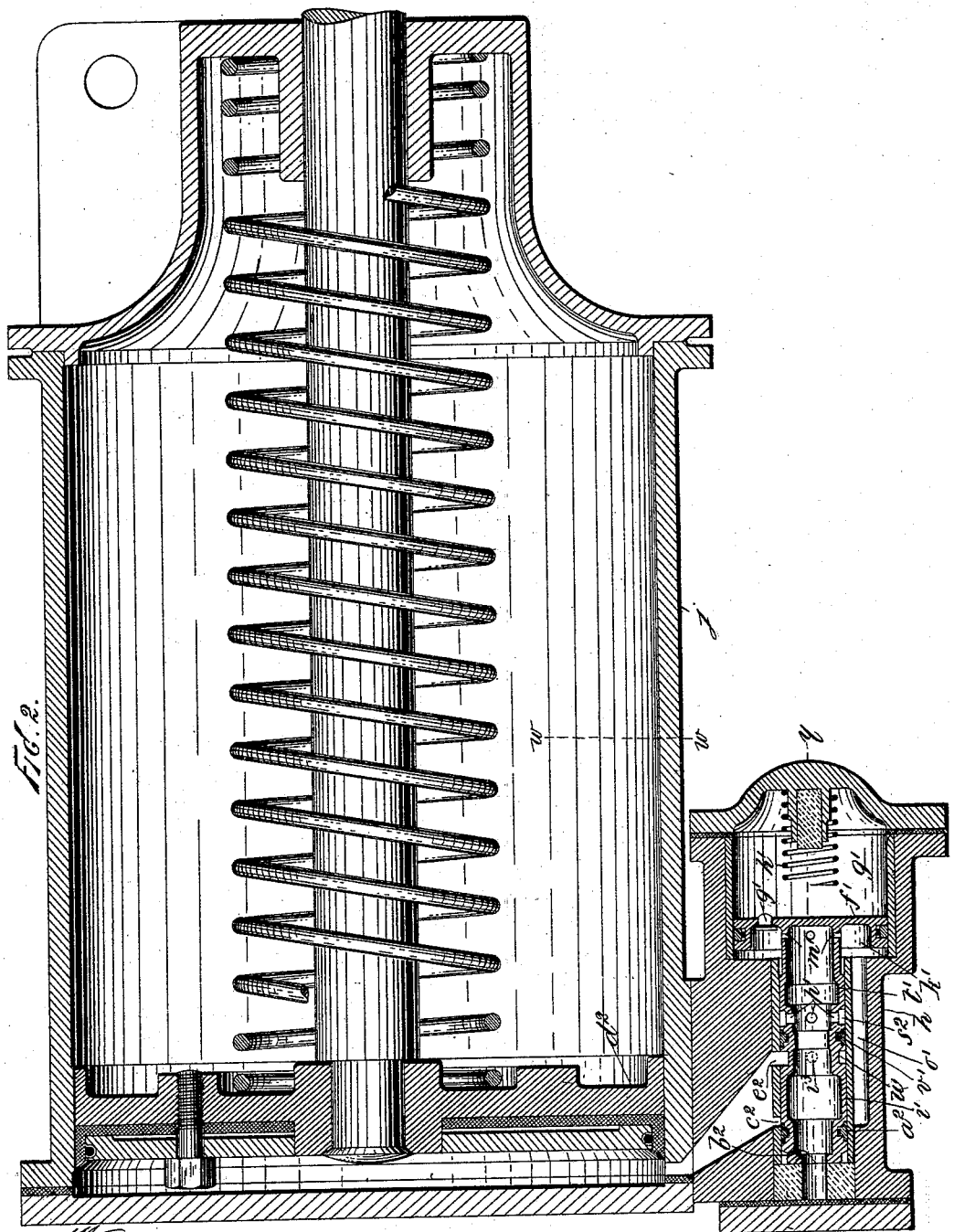

(No Model.)  4 Sheets—Sheet 3.
C. R. JAMES.
AIR BRAKE.
No. 524,990. Patented Aug. 21, 1894.
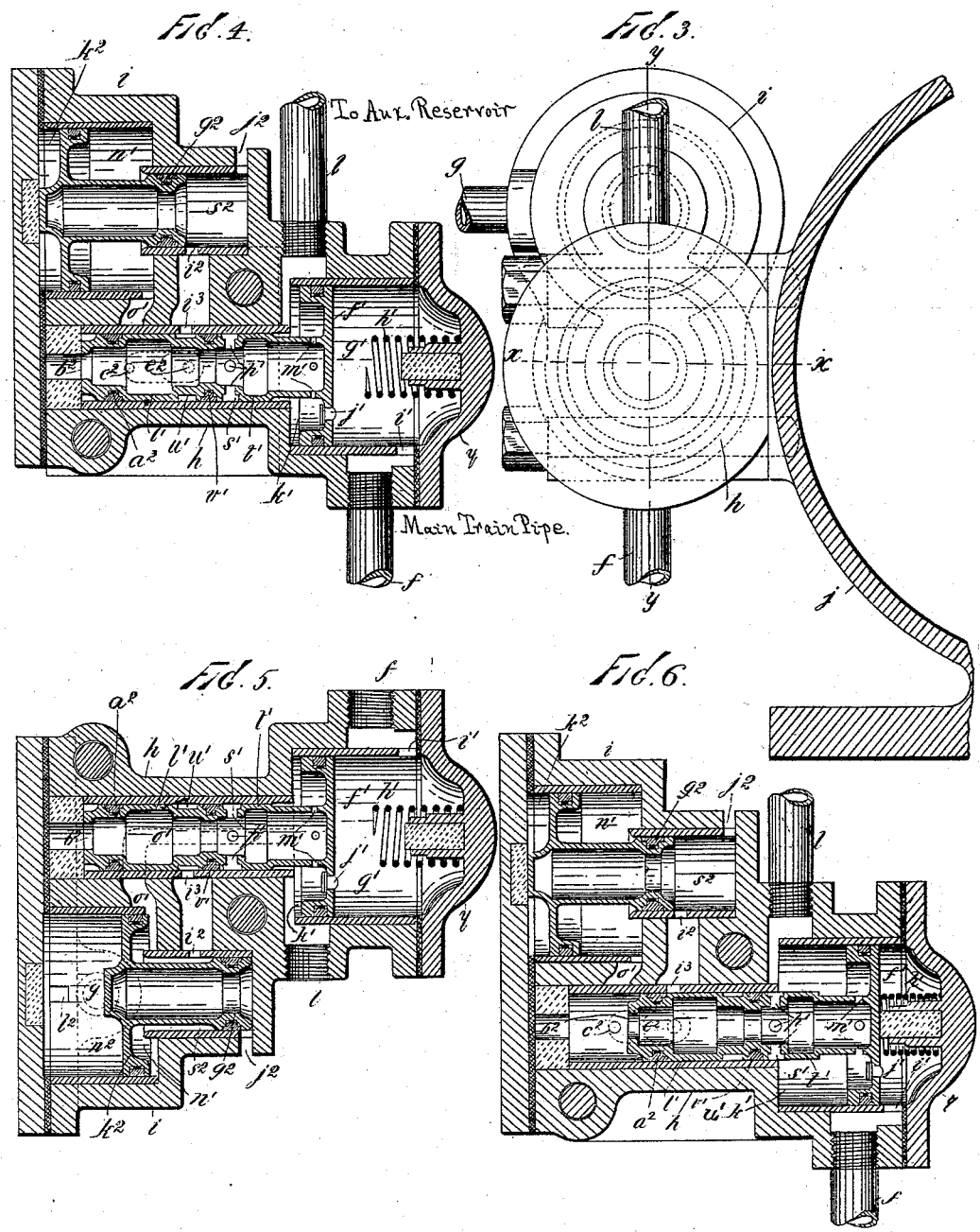

(No Model.) 4 Sheets—Sheet 4.
C. R. JAMES.
AIR BRAKE.
No. 524,990. Patented Aug. 21, 1894.
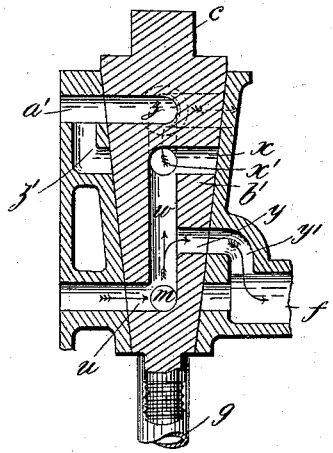
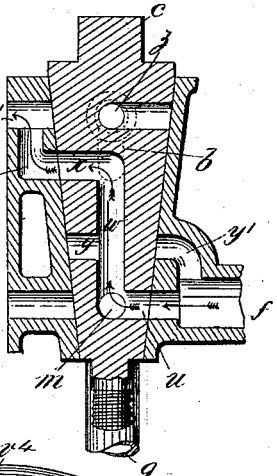
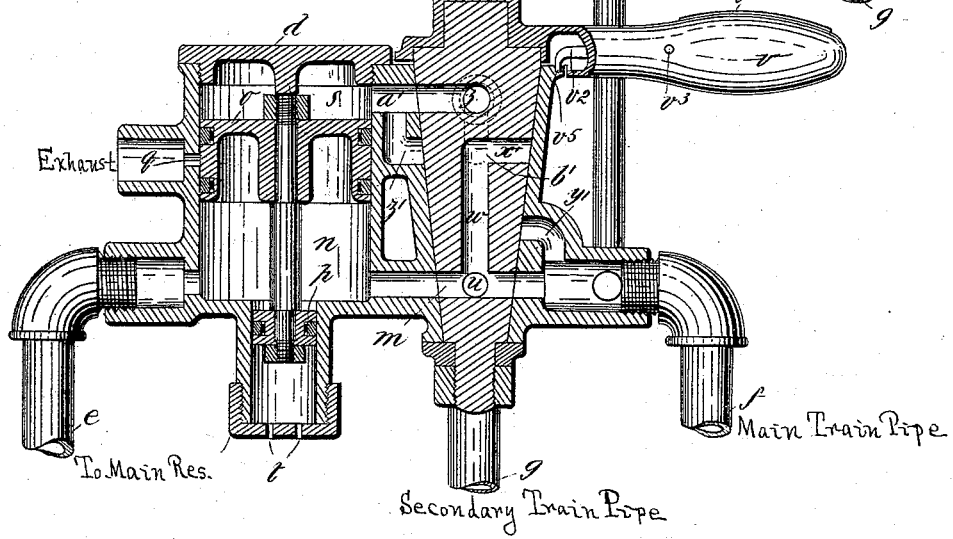
Witnesses:
John Buckler,
D. J. Morgan
Inventor:
Chris't R James
By A P Thayer
Attorney.

UNITED STATES PATENT OFFICE.

CHRISTOPHER R. JAMES, OF JERSEY CITY, NEW JERSEY.

AIR-BRAKE.

SPECIFICATION forming part of Letters Patent No. 524,990, dated August 21, 1894.

Application filed January 26, 1893. Serial No. 459,773. (No model.)

*To all whom it may concern:*

Be it known that I, CHRISTOPHER R. JAMES, a subject of the Queen of Great Britain, and a resident of Jersey City, in the county of Hudson and State of New Jersey, have invented certain new and useful Improvements in Air-Brakes, of which the following is a specification.

My invention consists in improvements in air brakes whereby the air may be applied to the brakes in a limited degree in the first place, and to a larger extent afterward for graduating the effect, or when an emergency requires, the brakes can be at once applied with full force, or can have full force after being applied as above, with direct communication of both the brake cylinder and the auxiliary reservoir on the car with the main reservoir and the pump on the locomotive, thus having the advantage of full force at all times if needed all as hereinafter fully described reference being made to the accompanying drawings, in which—

Figure 1, is a general plan view of my improved brake apparatus showing a brake cylinder and one auxiliary reservoir for a car connected with the main reservoir through the engineer's controlling valve. Fig. 2, is a horizontal section of the brake cylinder and main brake valve on line $x\,x$, Figs. 3 and 4, all in the normal positions. Fig. 3, is a transverse section of part of the brake cylinder on line $w\,w$, Figs. 1 and 2, and end elevation of the brake valve. Fig. 4, is a vertical longitudinal section through the duplex brake valve on line $y\,y$, Figs. 2 and 3 the parts being also in the normal positions. Fig. 5, is a section same as Fig. 4, but showing the opposite view and also showing the secondary brake valve shifted to the right. Fig. 6, is a section same as Fig. 4, with the main brake valve shifted to the right. Fig. 7, is a sectional elevation through the engineer's controlling valve on line $z\,z$, Fig. 1. Fig. 8 is a section of the several way cock of the engineer's valve on the same line as Fig. 7, but showing the cock shifted to the position for applying the brakes by gradual or moderate action. Fig. 9, is a section of the cock in the same plane when shifted to the position for applying the brakes with greatest force as in an emergency.

The main reservoir usually carried under the foot-plate of the locomotive is represented at $a$, Fig. 1, and is supplied with air through the pipe $b$, from the compressor.

The engineer's controlling valve consists of the several way cock $c$, and the auxiliary piston valve $d$ thereto, to which air is supplied from the main reservoir through the pipe $e$; $f$ is the main train pipe and $g$ the secondary train pipe. The brake valve consists of the primary piston valve $h$, and secondary piston valve $i$, with which the main and secondary train pipes communicate respectively.

$j$ represents the brake cylinder and $k$ represents the auxiliary reservoir on the car, between which and the primary brake valve there is communication by the pipe $l$.

The cock $c$ has the straight-way passage $m$, through it parallel with the handle $v$; when the cock is in the middle position, Figs. 1 and 7, said passage $m$ opens direct communication from the main reservoir $a$ into the main train pipe $f$, the inlet to said passage being through the chamber $n$, of the auxiliary piston valve $d$, between the large head $o$, and the small head $p$, of said valve, the former being to open and close the exhaust passage $q$, to the chamber $s$, and the latter being on its other side open to the atmosphere at $t$, to underbalance the large head when pressure is equal in chambers $n$ and $s$, and thereby open said exhaust $q$. The cock $c$ also has the branch passage $u$, communicating with passage $m$, at ninety degrees thereto and to the right of the handle; it also has the longitudinal central passage $w$, one end of which connects with the straight way passage $m$, and the other end has an issue $x$, at the side of the cock opposite to branch $u$, also issue $x'$ in the direction of the handle; and midway of the passage $w$ is a branch $y$ opening through the side of the cock, said issue $x$ and branch $y$ being in the same plane as branch $u$; there is also the right angle passage $z$, above the upper extremity of the central passage $w$, one issue of which is at the side opposite the handle and communicates with chamber $s$, through passage $a'$ when the cock is in the middle position, and the other issue is at the right hand side thereof, and communicates at the same time with the secondary train pipe $g$. There is a chamber $b'$ (dotted) in the cock case through which issue $x'$ communicates with pipe $g$ when the handle is shifted to the right; there is also a passage $y'$ in the case making communication between main train pipe $f$ and branch $y$ of the cock, when the cock is shifted to the right hand, and also a passage $z'$ making communication between issue $x$ of the cock and passage $a'$, when the cock is shifted to the left. Branch $u$, communicates with the main train pipe $f$ when the cock is shifted to the left, and with chamber $n$ when the cock is shifted to the right. The main train pipe is in communication with the gage $c'$ through the pipe $e'$ and the secondary pipe is in communication with said gage through pipe $d'$. The main brake valve has the large head $f'$ in the chamber $g'$ to which air is admitted from the controlling valve through port $i'$ by the main train pipe $f$, and in which is a buffer spring $h'$ to limit the shock when opening. This head $f'$ has several small valves $j'$ permitting air to pass through to the chamber $k'$ which is in communication with the auxiliary reservoir $k$ through the pipe $l$. This chamber $k'$ is also in communication with the interior of the hollow stem $l'$ of the valve through the small ports $m'$ admitting a limited quantity of air, and said chamber $k'$ is also in communication with chamber $n'$ of the secondary brake valve $i$ through the passage $o'$ cored in the case see Figs. 2 and 5. At $p'$ there are other large ports opening into the interior of the hollow stem $l'$ from an annular groove $s'$ in the exterior of the stem which groove is normally separated from the chamber $k'$ by the head $t'$. At $u'$ is another annular groove in the exterior of the valve stem $l'$ which is separated from groove $s'$ by the packed head $v'$ and the extremity of the said stem is separated from groove $u'$ by the packed head $a^2$, while the stem $l'$ communicates through the opening $b^2$ in its bottom with the case in which the stem works. At $c^2$ is a port admitting air from the case in which stem $l'$ works into the brake cylinder $j$, behind the brake piston $d^2$; at $e^2$ is another like port for admitting and exhausting air to and from said cylinder. This port $e^2$ is normally in communication with the groove $u'$ of the valve stem, and exhaust ports $i^3$ $i^2$ and $j^2$ as in Fig. 4, when the brakes are off. The secondary brake valve has a large head $k^2$ to which air is admitted in chamber $n^2$ through secondary train pipe $g$ and a small head $g^2$ working in chamber $s^2$, which chamber $s^2$ is in communication with chamber $n'$ or with exhaust port $j^2$ according as head $g^2$ is shifted to one side or the other of said port $i^2$, said head being shifted to the right of said port by air admitted under the large head $k^2$ through the secondary train pipe $g$ and port $l^2$, and to the left by the pressure of air normally acting on the other side and being admitted thereto from chamber $k'$ through the cored passage $o'$.

The operation is as follows: The cock $c$ being set in the middle position as represented in Figs. 1 and 7, air from the main reservoir $a$, enters through chamber $n$ of the auxiliary piston valve $d$ and the straight way passage of the cock $c$, directly to chamber $g'$ of the main brake valve $i$ through main train pipe $f$ and port $i'$, and taking effect on head $f'$ shifts said valve to its normal position Figs. 2, 4 and 5, opening exhaust port $e^2$ and permitting the air to escape from the brake cylinder through ports $i^3$, $i^2$ and $j^2$ for the release of the brakes, the secondary train pipe $g$ being partially exhausted through cock $c'$ and auxiliary valve $d$ at the moment of setting the cock in the middle position so that the secondary valve returns to normal position leaving exhaust ports $i^2$ and $j^2$ open. At the same time valves $j'$ open admitting air to chamber $k'$ and thence to the auxiliary reservoir $k$, through the pipe $l$, and the hollow stem of said valve fills also, through ports $m'$, ready for admitting air to the brake cylinder again when the brakes are to be again applied. The maximum pressure then shows on the gage by the hand represented in white, both pipe $d'$ and $e'$ being open thereto.

The secondary train pipe is only partially exhausted as above stated because when the pressure falls in chamber $s$, to a certain extent it is overbalanced by the pressure under head $o$, which then rises and cuts off further exhaust.

To apply the brakes with moderate effect the cock $c$ is shifted to the left hand from the middle position which shuts off the supply of air through the main pipe and opens said pipe to chamber $s$ of the auxiliary piston valve $d$ through passages $u$, $w$ and $x$, as seen in Fig. 8; the back pressure on head $o$, depresses it and opens exhaust port $q$ through which the air pressure is so reduced in chamber $g'$ of main brake valve $h$, that air from the reservoir $k$ taking effect on the other side of head $f'$ and closing valves $j'$, shifts the valve to the right, opening brake cylinder port $c^2$ to air from the hollow stem of the valve, which being supplied through small ports $m'$, takes moderate effect, but a little later head $t'$ of the stem rises into chamber $k'$ above the case in which it works, and opens ports $p'$ thereto admitting a larger supply which takes greater effect in applying the brakes. The reduction of pressure in the main train pipe and chamber $g'$ is then indicated by the change of the pointer as shown in black, communication being then through pipe $e'$. In this condition the air pressure is reduced in reservoir $k$ by the amount admitted to the brake cylinder, so that when another application of maximum force may be required as often happens in cases of emergency it cannot be had, the main train pipe being shut off. To overcome this difficulty and enable full pressure to be instantly let onto both the auxiliary reservoir and the brake piston after first application as above described, and also for application of maximum force in the first place when required, I have provided the secondary brake valve, and secondary train pipe, and have constructed the cock of the engineer's valve in the relations thereto as before described, the operations of which are as follows: Whether the cock $c$ be in the middle position or in the left hand position as last described, it is shifted to the right hand position, in which position both the main train pipe $f$, and the secondary train pipe are open as will be seen in Fig. 9, the one through passages $u, w, y$, and $y'$; and the other through passages $u, w, x'$ and chamber $b'$ of the cock case. The valve $h$ is therefore opened to air under direct pressure from the main reservoir and the auxiliary reservoir is replenished under like pressure the air entering through valves $j'$, chamber $k'$ and pipe $l$. At the same time air of full pressure enters through secondary train pipe $g$, through port $l^2$ behind the large head $k^3$, of secondary brake valve $i$ and shifts it so as to open communication with the brake cylinder through cored passage $o'$, chamber $n^2$ and ports $i^2$ $i^3$, and $e^2$ for air of full pressure both from the auxiliary reservoir $k$ and the main train pipe $f$, thus applying maximum force at will. Return of the cock $c$ to the middle position opens secondary train pipe $g$ through passages $z, a'$ to chamber $s$, head $o$ of auxiliary valve being depressed until the escape of the overbalancing pressure in said chamber $s$ through exhaust port $q$ reduces pressure under head $k^2$ of the secondary brake valve $i$, which is then shifted back by pressure in chamber $n'$, so that head $g^2$ passes port $i^2$ and opens the brake cylinder to exhaust through port $j^2$. When this takes place further reduction of pressure and waste of air from chambers $n^2$ and $s$ is prevented by head $o$ of auxiliary valve $d$ being overbalanced in chamber $n$ so that it closes exhaust port $q$.

It will be seen that after the application of maximum force with direct action of air of the main reservoir through the instrumentality of the secondary brake valve, as above described, and when through the checking of the train the maximum force is no longer needed, the lesser force by the air of the auxiliary reservoir alone may be again applied through the primary valve alone as in the first instance.

The lever $v$ has the usual spring latch $v^2$ within it pivoted at $v^3$ to lock it in position by engaging in stop holes $v^5$, part of said lever protruding at $v^4$ to be depressed when the handle is grasped by the engineer to release the cock preparatory to shifting it.

The auxiliary piston valve attachment to the several way cock of the engineer's controlling valve, being claimed in another application filed by me August 10, 1893, Serial No. 482,833, is disclaimed in this application.

I claim—

1. The combination with the main reservoir brake cylinder and auxiliary reservoir, of the duplex brake valve consisting of the main valve and connections, constructed as shown to apply the brakes by the air from said auxiliary reservoir; and the secondary valve, and means to apply the air directly from the main reservoir to the brake cylinder through the main train pipe and at the same time to replenish said auxiliary reservoir through the said main train pipe substantially as described.

2. The combination with the brake cylinder and auxiliary reservoir, of the duplex brake valve consisting of the main valve in communication with the main train pipe and the reservoir, and with the brake cylinder, and the secondary valve in communication with the secondary train pipe, and with the brake cylinder, and also with the main valve, to apply the brakes by the air of the auxiliary reservoir or by the air direct from the main reservoir, or both, said main train pipe being in communication with the auxiliary reservoir and with the secondary valve through the valved head of the main valve substantially as described.

3. The combination with the brake cylinder, of the main brake valve having the head $f'$ in the chamber $g'$, in communication with the engineer's controlling valve, the valves $j'$ in said head opening into chamber $k'$, in communication with the auxiliary reservoir, the hollow stem of said valve having the heads $t', v'$ and $a^2$; contracted ports $m'$ for limited initial effect on the brake, larger ports $p'$ for the full effect of the auxiliary reservoir thereon, and the port $b^2$ in the end communicating with the brake cylinder, said stem also having the exterior annular grooves $p', u'$; said valve case having the ports $c^2$ and $e^2$ substantially as described.

4. The combination of the secondary brake valve having the head $k^2$ in communication with the secondary train pipe, on the larger side, and on the other side constantly in communication with the main train pipe and the auxiliary reservoir through passage $o'$; also having the small head $g^2$, with the ports $i^2, i^3$ in communication with the brake cylinder ports and the exhaust port $j^2$, said passage $o'$ and ports $i^2$ and $i^3$ adapted to charge the brake cylinder with full pressure from the main train pipe when the secondary train pipe is opened to said secondary valve, and port $j^2$ adapted to exhaust the same when the pressure is reduced in said secondary pipe substantially as described.

5. The combination of the secondary brake valve having the head $k^2$ in communication with the secondary train pipe on the larger side, and on the other side in communication with the main train pipe, and with the auxiliary reservoir through passage $o'$, also having the small head $g^2$ with the ports $i^2, i^3$ and $j^2$ and the main brake valve having the annular groove $u'$, communicating with port $i^3$ and the brake cylinder port $e^2$, said passage $o'$ and ports $i^2$ and $i^3$ adapted to charge the brake cylinder with full pressure from the main train pipe when the secondary train pipe is opened to said secondary valve, and port $j^2$ adapted to exhaust the same when the pressure is reduced in said secondary pipe substantially as described.

6. The duplex brake valve consisting of the main brake valve having the head $f'$ in the chamber $g'$ in communication with the engineer's controlling valve, the valves $j'$ in said head opening into chamber $k'$ in communication with the auxiliary reservoir; the hollow stem of said valve having the heads $t'$, $v'$ and $a^2$; contracted ports $m'$ for limited initial effect on the brake, larger ports $p'$ for the full effect of the auxiliary reservoir pressure thereon, and the port $b^2$ in the end communicating with the brake cylinder, said stem also having the exterior annular grooves $s'$, $u'$ and ports $c^2$ and $e^2$; and the secondary brake valve having the head $h^2$ in communication with the secondary train pipe on the larger side and on the other side in communication with the main train pipe and the auxiliary reservoir through the passage $o'$, said secondary valve also having the small head $g^2$, ports $i^2$ and $i^3$ in communication with the brake cylinder ports through groove $u'$ of the main valve, and the exhaust port $j^2$; said passage $o'$ and ports $i^2$ and $i^3$ adapted to charge the brake cylinder with full pressure from the main train pipe when the secondary train pipe is opened to said secondary valve, and port $j^2$ adapted to exhaust the same when the pressure is reduced in said secondary pipe substantially as described.

7. The combination with the main and secondary train pipes, and the main and secondary brake valves respectively connected with the said pipes, of the improved air brake controlling valve consisting of the cock having in the middle position the direct passage $m$, communicating with the main reservoir and main train pipe, also the exhaust passage for the secondary train pipe, also, in the position at one hand of the said middle position, having the exhaust passages in communication with the main train pipe, and the part then closing the secondary train pipe, and also, in the position at the other hand of said middle position having passages communicating with the main reservoir and main train pipe, and with said reservoir and said secondary train pipe substantially as described.

8. The improved air brake controlling valve consisting of the cock having in the middle position the direct passage $m$, communicating with the main reservoir and main train pipe, also the exhaust passage for the secondary train pipe, also, in the position at one hand of the said middle position having the exhaust passage communicating with the main train pipe and the part then closing the secondary train pipe, and also, in the position at the other hand of said middle position having passages communicating with the main reservoir and main train pipe, and with said reservoir and said secondary train pipe, in combination with the main and secondary train pipe and brake valves substantially as described.

9. The improved air brake controlling valve consisting of the cock having in the middle position the direct passage $m$, communicating with the main reservoir and main train pipe, also the exhaust passage for the secondary train pipe, also in the position at one hand of the said middle position having the exhaust passage communicating with the main train pipe, and also, in the position at the other hand of said middle position having passages communicating with the main reservoir and the main train pipe and with said reservoir and said secondary train pipe; and the auxiliary valve having the larger and smaller heads between which is the communication of the main reservoir and said passage $m$, of the cock, and the larger head controls the exhausts of the main and secondary train pipes, in combination with the main and secondary train pipes and brake valves substantially as described.

10. The combination of the main brake valve, main train pipe, auxiliary reservoir and brake piston, said main valve and auxiliary reservoir adapted to admit air to the brake cylinder from the auxiliary reservoir for normal action; the secondary brake valve, and secondary train pipe adapted to admit air to the brake directly from the main reservoir through the main train pipe for excessive action, and the controlling valve having in the position at one hand of the middle position the passages controlling the main valve for normal action of the brake by air from the auxiliary reservoir, and having, in the position at the other end of the middle position the passages controlling the secondary brake valve for excessive action of the brake by air directly from the main reservoir, said valve having in the middle position the passages releasing the brake substantially as described.

Signed at New York city, in the county and State of New York, this 13th day of January, A. D. 1893.

CHRISTOPHER R. JAMES.

Witnesses:
W. J. MORGAN,
C. E. WHITNEY.

Correction in Letters Patent No. 524,990.

It is hereby certified that in Letters Patent No. 524,990, granted August 21, 1894, upon the application of Christopher R. James, of Jersey City, New Jersey, for an improvement in "Air-Brakes," an error appears in the printed specification requiring the following correction, viz: In line 106, page 4, the word "end" should read *hand;* and that the said Letters Patent should be read with this correction therein that the same may conform to the record of the case in the Patent Office.

Signed, countersigned, and sealed this 4th day of September, A. D. 1894.

[SEAL.]

JNO. M. REYNOLDS,
*Assistant Secretary of the Interior.*

Countersigned:
S. T. FISHER,
*Acting Commissioner of Patents.*